March 16, 1926.
D. H. DONEGAN
1,576,954
PROCESS AND APPARATUS FOR RECOVERING PRECIOUS METALS FROM SANDS
Filed March 21, 1925 2 Sheets-Sheet 2
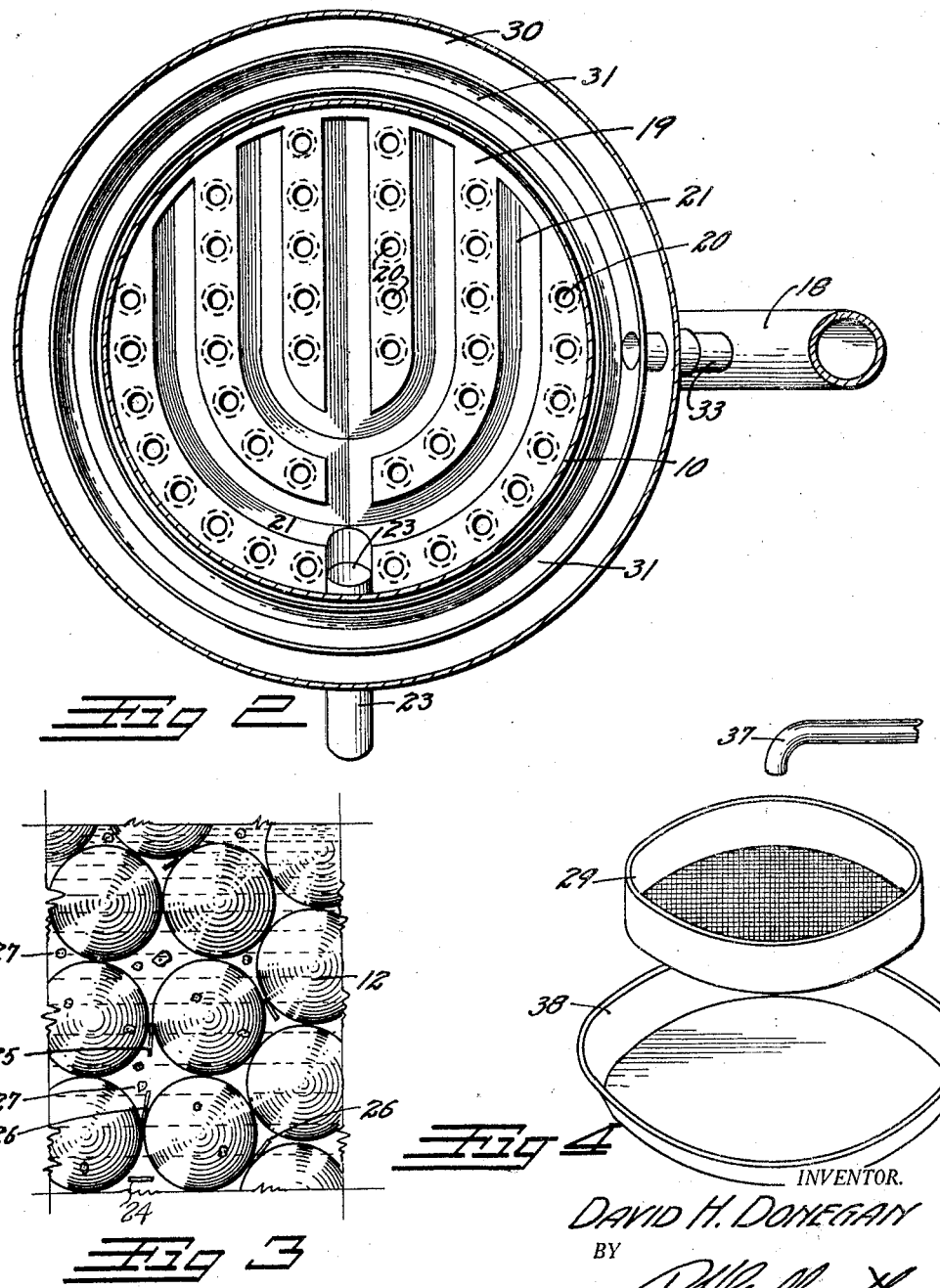

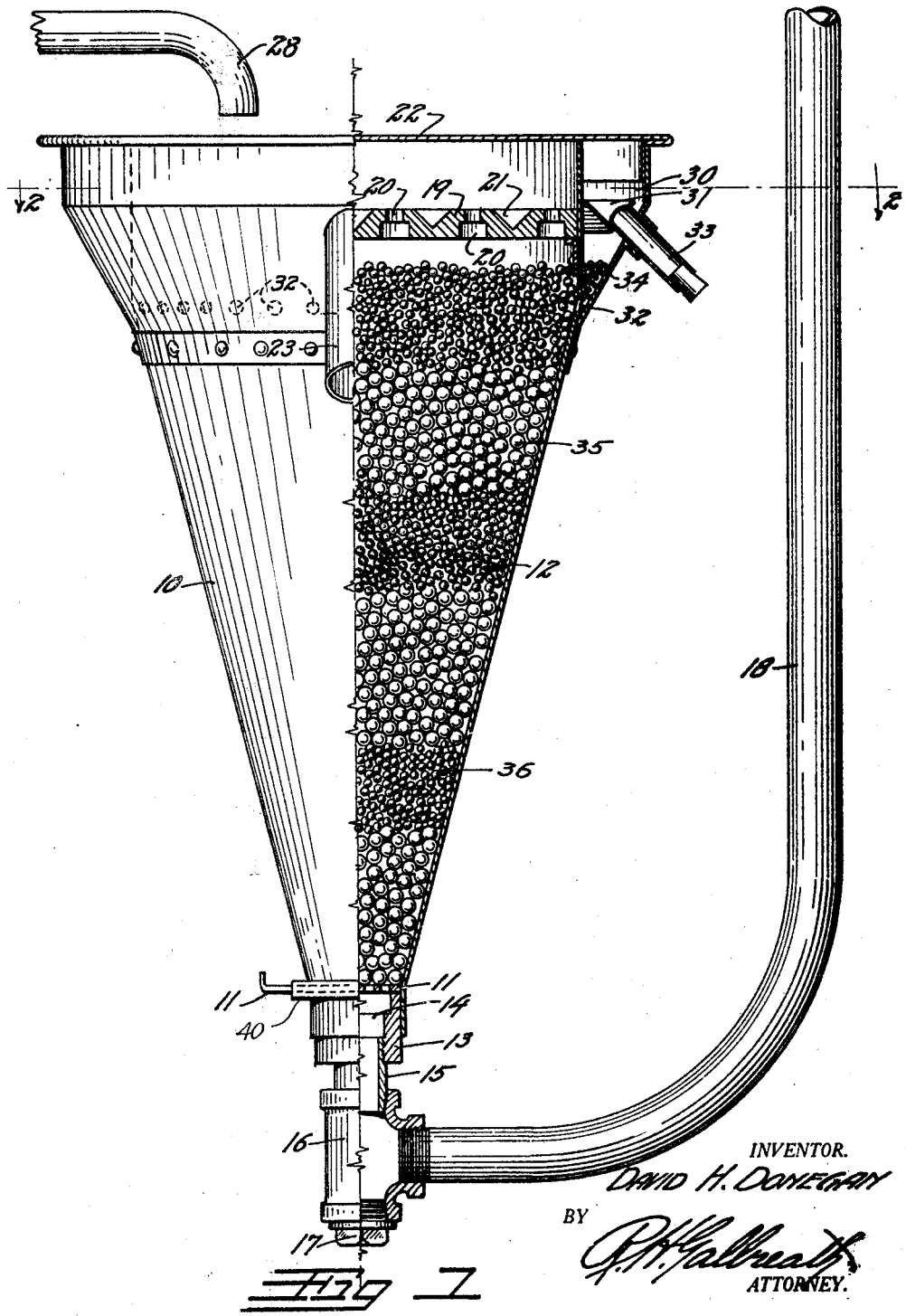

Patented Mar. 16, 1926.

1,576,954

UNITED STATES PATENT OFFICE.

DAVID H. DONEGAN, OF PLACERVILLE, COLORADO.

PROCESS AND APPARATUS FOR RECOVERING PRECIOUS METALS FROM SANDS.

Application filed March 21, 1925. Serial No. 17,274.

*To all whom it may concern:*

Be it known that I, DAVID H. DONEGAN, a citizen of the United States of America, residing at Placerville, in the county of San Miguel and State of Colorado, have invented certain new and useful Improvements in Processes and Apparatus for Recovering Precious Metals from Sands, of which the following is a specification.

This invention relates to a process, and to the apparatus used in the process, for recovering free gold, platinum, etc., from sands. The process and apparatus, while not limited, is more particularly adaptable for treating black sand concentrates. Heretofore, the only successful process for removing gold from black sand has been by amalgamation. Gravity separation in water has been impractical especially in recovering flake or leaf gold from black sand owing to the fact that the flake or leaf gold would be carried cross-wise of the current thus presenting a relatively larger surface to the action of the current than the grains of black sand, so that, in spite of its greater specific gravity, the gold would be carried across the riffles or collecting pockets, while the black sand would be deposited and packed therein. It has therefore been necessary to treat the black sands with amalgam, cyanide, smelting, or other expensive and impractical processes.

The principal object of this invention is to provide a process and apparatus which can be used for the recovery of precious metals from black sands and other concentrates by gravity separation in a current of water without the use of amalgam or dissolving chemicals.

A further object is to provide a method and apparatus in which the gold may be readily removed from the bed employed, without the use of amalgam or chemicals.

A still further object is to provide a device which can be used in concentrating gangue in addition to its use for the direct precious metal separation.

Other objects and advantages reside in the method and process and in the apparatus for carrying out the same which result in simplicity, economy, and efficiency, and which will become more apparent from the following description.

In the following detailed description of the invention, reference is had to the accompanying drawing which forms a part hereof. Like numerals refer to like parts in all views of the drawing, and throughout the description.

In the drawing:

Fig. 1 is a side elevation of the preferred form of apparatus employed in my process. In this view the right hand portion is shown in vertical section.

Fig. 2 is a cross section through the apparatus of Fig. 1, taken on the line 2—2, Fig. 1.

Fig. 3 is a magnified detail of the separating bed employed in the device illustrating the selective action between the sand particles and leaf or flake metallic particles.

Fig. 4 is a detail view illustrating the apparatus required for completely cleansing the bed.

The apparatus comprises a funnel-shaped container 10 in the bottom of which a removable screen 11 is placed which supports a bed 12 composed of alternate layers, 35 and 36, of large and small spherical bodies. I prefer to form the bed 12 of alternate layers of coarse and fine shot ranging from comparatively large buck shot to small B B shot. The container 10 terminates in an inlet nipple 13, the inner face of which is preferably formed in a series of steps 14. Screwed into the inlet 13 is an inlet pipe 15, which terminates in a fitting 16, closed at the bottom by means of a plug 17, and with which communicates a feed pipe 18.

Above the bed 12 in the container 10 is placed a grating 19 carrying a plurality of countersunk openings 20 between which a series of channels 21 are formed. The top of the container 10 is closed by means of a removable lid 22.

In operation, the gangue or gold bearing sands suspended in water flow down the pipe 18, from a height corresponding to the pressure desired, into the fitting 16 through the inlet pipe 15 and upward through the bed 12. As the suspension enters the inlet 13, the increasing diameters thereof will correspondingly decrease the velocity of flow thus allowing the heavier particles of metal to be deposited in the fitting 16.

As the suspension flows upward through the bed, the increasing diameter of the container 10 will constantly decrease the velocity of flow thus tending to drop the metallic particles as the top of the container is approached. The lighter metallic particles will, of course, be deposited toward the top of the container where the velocity is least. The lighter particles of sand will be carried upward through the openings 20 into the channels 21, from which, they will flow through a tailings outlet 23. The countersunk or decreasing form of the openings 20 tends to obstruct and hinder any heavier metallic particles from flowing through the openings.

As before stated, flake gold particles have a tendency to remain cross-wise of the current. This tendency has made it heretofore impractical to separate such particles by gravity in a flow of water. In the present process, however, the flow must pass through the millions of interstices or cells between the shot in the bed. These cells are wedge-shaped and practically all of different sizes and shapes, even throughout a layer of the same size shot and, when the bed is composed of layers of various sized shot, we have an infinite number of different sized spaces or cells.

Referring to Fig. 3, let us suppose a flake of gold enters the bed in a cross-wise position to the flow as indicated at 24. It can move upward in this position only a small distance before reaching a narrowing space between two shot. To pass through the narrowing space it is necessary for the flake to turn edge-wise to the flow, as illustrated at 25. When in this position, the thin edge presents practically no resistance to the flow of the current, thus leaving the flake practically unsupported. It will then drop back against the current and lodge in some wedge-shaped crevice between the shot, such as illustrated at 26, where it will be held in position with its edge presented to the current. In this position, the current is unable to lift the particle further.

Should a particle be so small as to pass through the first layer of fine shot, it will meet with a constantly decreasing velocity as it progresses upward and upon leaving the comparatively small spaces between the fine shot and entering the relatively larger spaces between the coarse shot will be immediately subjected to a reduced velocity in flow which will tend to deposit it in one of the spaces where it will be maintained in an edge-wise position from further rising. It is desired to be understood that the shot could be formed of any substance and are not amalgamated. The entire action of the bed is caused by the shape and size of its component parts, not by any affinity or surface adhesion of the bed particles for the metallic substances of the sand.

Should the bed be formed of spherical objects, of a size substantially greater than common buck shot, the efficiency of the device is practically destroyed for the flow will not be broken up into sufficiently small currents, and the pockets between the bodies will not be sufficiently small to maintain the metal carried by the current. The sand particles, especially when treating black sand, never occur in flakes but are small irregularly shaped blocks, such as illustrated at 27, Fig. 3. Having such a form, they present substantially the same surface area to the force of the current regardless of what position they may be in. Therefore, in their winding course through the bed they are propelled equally at all times and are therefore carried through the entire bed and upward through the openings 20 where they will be deposited in the channels 21 and carried off with the outward flow of the current.

When the bed 12 has become loaded with metal, the plug 17, the grating 19, and the lid 22 are removed and a downward current of water is passed through the bed from any suitable source, 28. This current, which is now acting in the same direction as gravity upon the contained flakes, will carry them downward discharging them through the lower opening in the fitting. To facilitate the removal of the deposits, the container 10 may be agitated during the reverse flow.

This method of cleansing the bed is sufficient for all practical operations and substantially the entire content of precious metal may be removed in this manner. Should it be desired, however, to make a hundred per cent recovery, such as in a laboratory assay, the screen 11 can be withdrawn allowing the entire bed to discharge through the fitting 16. The bed is then placed in a screen 29 and washed under a current of water from any suitable source 37 until the entire precious metal content has been removed.

In some installations of the apparatus, I prefer to surround the container 10 with a peripheral chamber 30, in which a ring-shaped channel 31 is carried. The chamber 30 communicates with the container 10 through a series of openings 32 opening to the bottom of the chamber 20. The ring-shaped channel 31 discharges through a spout 33. The chamber 30 is partially filled with very fine shot 34.

When provided with the chamber 30, the apparatus may be used as a concentrator and will make a three-way separation, that is, the tailings will flow from the spout 23, the lowest grade concentrates flowing from the spout 23, while the high grade concentrates are held in the bed 12. This results from the fact that the tailings have passed through a greater amount of bed than have the concentrates which flow from the spout 23, and from the fact that the heavier particles will travel through the bed more slowly than the lighter particles and will therefore work themselves toward the exterior of the container 10 and be carried upward along the walls into the openings 32. Should it be desired to use the device for simply one stage separations, the spout 33 may be shut off by means of a plug 39 or in any other desired manner. This will cause the peripheral chamber 30 to cease to operate.

The screen 11 is carried in a slide 40 through which it may be withdrawn to discharge the contents of the container 10. I have found that the efficiency of operation of the process and apparatus is practically destroyed if the shot of which the bed is composed exceeds one-fourth inch in diameter.

While a specific form of the improvement has been described and illustrated herein, it is desired to be understood that the same may be varied within the scope of the appended claims, without departing from the spirit of the invention.

Having thus described the invention, what I claim and desire secured by Letters Patent is:—

1. The process of separating flaky metallic particles from sand, comprising mixing the sand, containing said particles with a liquid and passing the resulting suspension upward through a bed of small spherical bodies, said bodies being proportioned to form passages for fluid, that will position the flaky particles and maintain them in positions minimizing the tractive effect of the fluid.

2. The process of separating flaky metallic particles from sand, comprising mixing the sand, containing said particles with a liquid; passing the resulting suspension upward through a bed of comparatively small spherical bodies, said bodies being proportioned to form passages for fluid, that will position the flaky particles and maintain them in positions minimizing the tractive effect of the fluid and subsequently passing a current of water downward through said bed and thereby removing the retained flaky particles.

3. The process of separating metallic particles from sand comprising the passing of said sand in a suspension upward through a series of wedge-shaped cells, designed to retain said particles said cells increasing in number as the flow progresses and subsequently passing a liquid downward through said cells so as to loosen and remove the retained particles.

4. An apparatus for separating metallic particles from sand comprising a bed and means for admitting a suspension of said sand in solution at the bottom of said bed, said bed comprising alternate layers of metallic spherical bodies of varying diameters proportioned to retain said particles.

5. An apparatus for separating metallic particles from sand comprising a container; a bed of spherical bodies carried in said container a screen supporting said bed and means for introducing said sand in solution through screen, and a grating carried above said bed and provided with channels for draining the fluid passed by said bed from said container, said grating being provided with a series of openings placed between said channels.

6. An apparatus for separating metallic particles from sand comprising a funnel-shaped container; a bed of spherical bodies carried in said container a screen supporting said bed and means for introducing said sand in suspension through screen, and a grating carried above said bed and provided with channels for draining the fluid passed by said bed from said container, said grating being provided with a series of openings placed between said channels, said openings being larger at their bottoms than at their tops.

7. An apparatus for separating metallic particles from sand, comprising a funnel-shaped container; a bed adapted to retain said particles carried in said container; means for admitting a suspension of said sand at the bottom of said container; a peripheral chamber surrounding said container and having openings communicating therewith; means for discharging suspension from the upper portion of said chamber; a second bed for the retention of said particles carried in said peripheral chamber and a discharge channel in said peripheral chamber arranged above said second bed.

8. An apparatus for separating flaky metallic particles from sand comprising a container; a bed of relatively small spherical bodies carried in said container said bodies being proportioned to form passages for fluid and arranged so as to position said flaky particles in a manner that will minimize their resistance to the flow of said fluid; means for introducing a suspension of said sand at the bottom of said container; a peripheral chamber communicating with and surrounding the upper portion of said container and a second similarly proportioned bed carried in said second chamber.

9. An apparatus for separating flaky metallic particles from sand comprising a container; a bed of relatively small spherical bodies carried in said container said bodies being proportioned to form passages for fluid and arranged so as to position said flaky particles in a manner that will minimize their resistance to the flow of said fluid; means for introducing a suspension of said sand at the bottom of said container; a peripheral chamber communicating with and surrounding the upper portion of said container; a second similarly proportioned bed carried in said second chamber, and channels arranged above both said beds for carrying away the fluid from above said beds.

In testimony whereof, I affix my signature.

DAVID H. DONEGAN.